US005955024A

United States Patent [19]

Gross

[11] Patent Number: 5,955,024

[45] Date of Patent: Sep. 21, 1999

[54] METHOD FOR HEAT-TREATING FRESHLY CAST CANDLES

[75] Inventor: Werner Gross, Nettatal, Germany

[73] Assignee: Spezial-Maschinenfabrik Hans Kürschner GmbH & Co. KG, Nettetal, Germany

[21] Appl. No.: 09/037,582

[22] Filed: Mar. 10, 1998

[30] Foreign Application Priority Data

Mar. 10, 1997 [DE] Germany ........................... 197 09 792

[51] Int. Cl.$^{6}$ ............................ B29C 71/02; B29C 59/16

[52] U.S. Cl. .......................... 264/481; 264/340; 264/345; 264/492; 425/803; 431/288

[58] Field of Search .................................... 264/340, 345, 264/519, 522, 80, 349, 271.1, 279, 479, 481, 492; 425/387.1, 402, 174.4, 803; 431/288

[56] References Cited

U.S. PATENT DOCUMENTS

| | | | |
|---|---|---|---|
| 2,515,136 | 7/1950 | Pigott | 425/174.4 |
| 2,647,279 | 8/1953 | Schroeder | 425/803 |
| 3,058,163 | 10/1962 | Kranc et al. | 425/174.4 |
| 3,983,677 | 10/1976 | Lundbom | 53/3 |
| 4,419,070 | 12/1983 | Gustafson | 431/126 |

*Primary Examiner*—Jan H. Silbaugh
*Assistant Examiner*—Michael Poe
*Attorney, Agent, or Firm*—Herbert Dubno; Andrew Wilford

[57] ABSTRACT

A candle has an elongated wax body formed around a wick and having a tip from which the wick projects and which is formed with a shoulder. The candle is oriented upside down with the tip from which the wick projects directed downward and heat is projected against a surface of the tip to melt wax on the surface of the tip such that the melted wax runs down and drips off the candle tip and wick projecting therefrom. Heat is projected against the tip by directing a hot-air jet against the tip. Alternately this can be done by projecting infrared radiation against the tip. To achieve the most attractive results the candle is rotated about a central longitudinal candle axis while projecting heat against its tip.

4 Claims, 3 Drawing Sheets

METHOD FOR HEAT-TREATING FRESHLY CAST CANDLES

FIELD OF THE INVENTION

The present invention relates to the manufacture of candles. More particularly this invention concerns a system for treating the candles after they are initially formed.

BRIEF DESCRIPTION OF THE DRAWING

In the accompanying drawing from which objects, features, and advantages of the invention will become apparent.

BACKGROUND OF THE INVENTION

Figure 3:
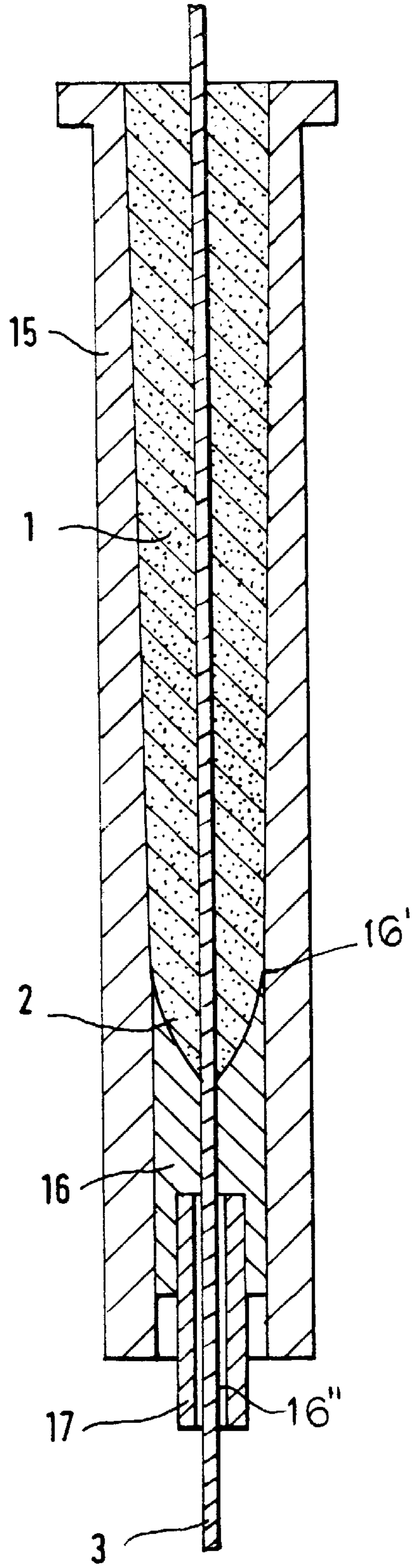
FIG. 3 PRIOR ART
FIG. 3 is a vertical section through a standard candle mold.
Figure 4:
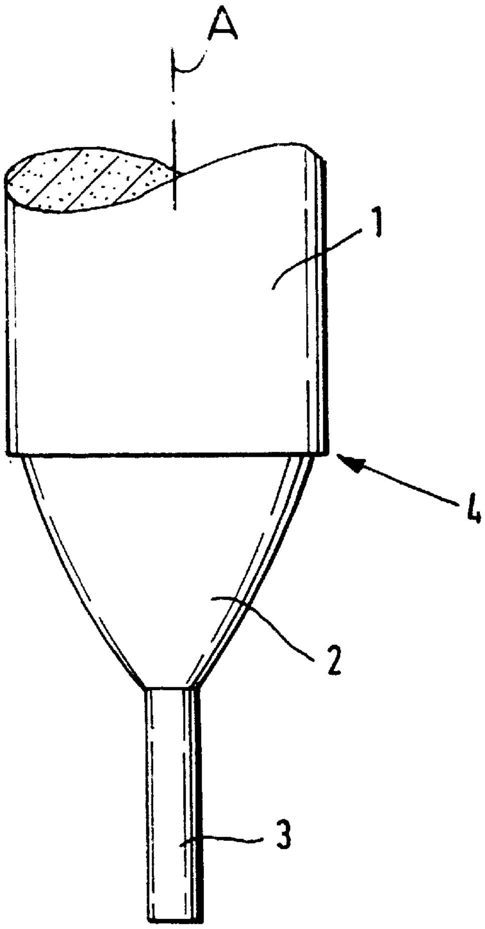
FIG. 4 PRIOR ART
FIG. 4 shows a tip of a freshly cast candle.

As shown in FIG. 3, a candle is made in a basically tubular upright mold 15 whose lower end is generally closed by a piston 16 having an upwardly concave upper end with a squared-off annular edge 16' and a central passage 16". The mold 15 is fitted with a flammable wick 3 that extends axially centrally through it and out through the piston passage 16", and is then filled with a body 1 of wax that becomes the candle once it hardens. After the wax has cooled sufficiently the piston 16 is retracted by means of its piston rod 17 and the candle 1 is pushed axially out of the mold 15. The finished product as better shown in FIG. 4 has a tip 2 that is formed as a body of revolution centered on the axis A of the candle 1, with a sharp shoulder 4 formed at the location where the annular upper edge 16' of the piston 16 came to rest.

This edge or shoulder 4 is considered an unattractive feature, particularly in a tapered candle with a pointed tip. Nonetheless such candles must be made at the lowest possible unit cost since they are inexpensive disposable items, thus the extra cost of a machining step, for instance, to carve off the shoulder 4 cannot be justified.

OBJECTS OF THE INVENTION

It is therefore an object of the present invention to provide an improved system for treating freshly made candles.

Another object is the provision of such an improved system for treating freshly made candles which overcomes the above-given disadvantages, that is so simple and inexpensive that it adds virtually nothing to the manufacture cost of the candles while giving them a more attractive look.

SUMMARY OF THE INVENTION

A candle has an elongated wax body formed around a wick and having a tip from which the wick projects and which is formed with a shoulder. According to the invention the candle is oriented upside down with the tip from which the wick projects directed downward and heat is projected against a surface of the tip to melt wax on the surface of the tip such that the melted wax runs down and drips off the candle tip and wick projecting therefrom.

This method therefore produces a candle that has a smooth tip that normally bespeaks a high-quality candle. The method is extremely simple to carry out and adds nothing significant to the cost of the candle. Furthermore this procedure soaks the wick with wax so that it stands up nicely, is easy to ignite, and does not burn down quickly when first lit.

According to the invention heat is projected against the tip by directing a hot-air jet against the tip. Alternately this can be done by projecting infrared radiation against the tip. To achieve the most attractive results the candle is rotated about a central longitudinal candle axis while projecting heat against its tip.

The apparatus according to the invention has a housing having a floor forming a wax-catching trough, side walls projecting upward from the floor, and a top wall formed with a plurality of openings through which respective candle tips can be inserted. The heating means is inside the housing.

SPECIFIC DESCRIPTION

Figure 1:
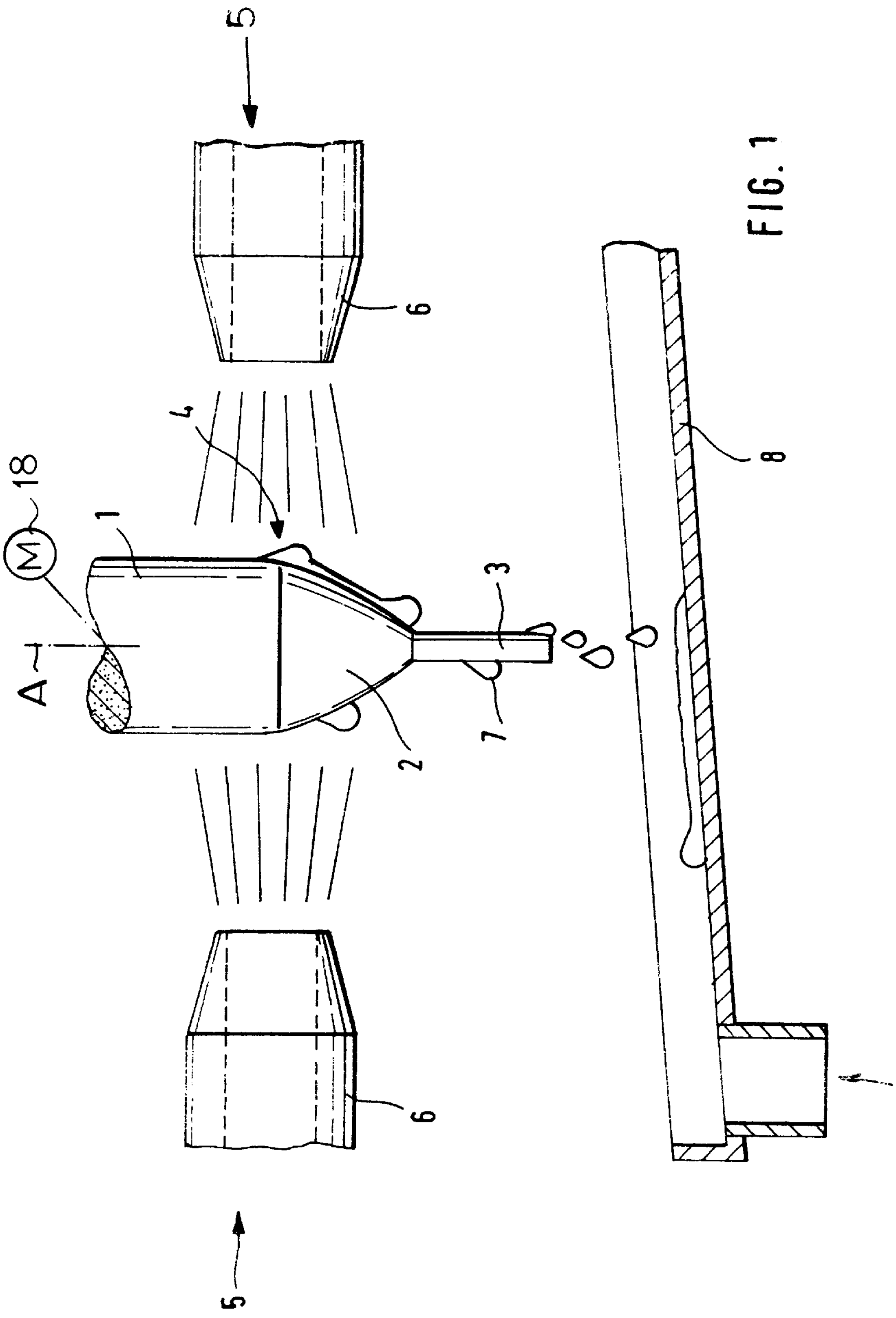
FIG. 1. is a simplified schematic side view illustrating the method of this invention.

As seen in FIG. 1, a candle 1 as described above is held immediately after removing it from the mold 15 between a pair of nozzles 6 from which jets 5 of hot air are projected. The candle 1 is rotated about its axis A by a motor 18 or the like so that drops 7 of wax melted from the tip area run down, dripping off the wick 3 into an inclined and heated catchment trough 8 having a drain 9. This quick step melts off the sharp edge 4 and leaves the candle 1 with a smooth tapered end resembling that of a high-quality candle.

Figure 2:
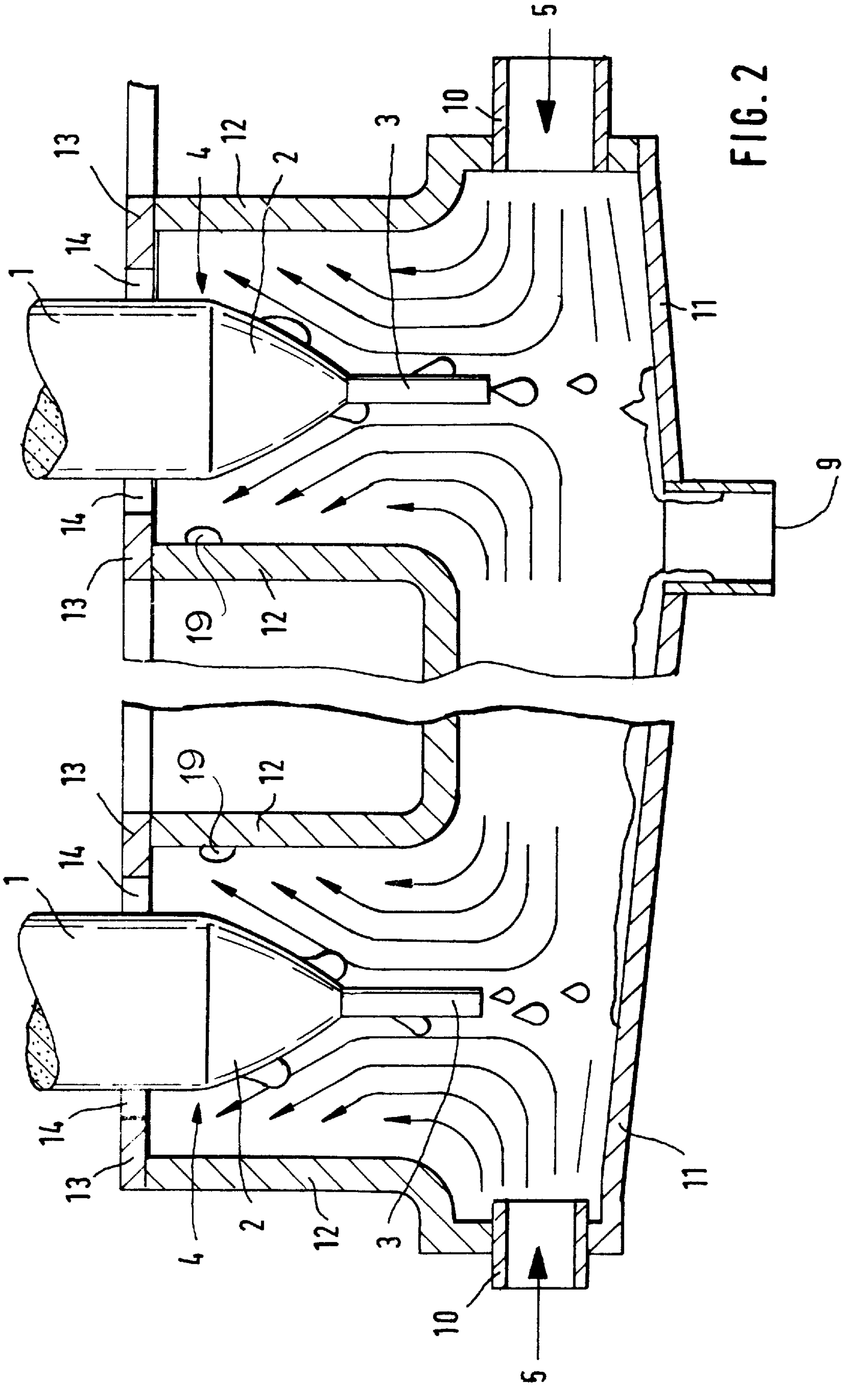
FIG. 2 is another side view of an apparatus for carrying out the method according to the invention.

FIG. 2 shows another system wherein a housing 11 has inlets 5 for hot-gas blasts 5 and side walls 12 capped by a top wall 13 formed with openings 14 through which candle tips 2 can be inserted for melting off the surface layer as described with reference to FIG. 1. Once again the drops 7 of wax fall down in the housing 11 and run across to its outlet 9. The hot air admitted at the fittings 10 flows out of the housing through the holes 14 that are much bigger than the candles 1. In addition to the hot-air jets 5, this system can have small infrared-heat generators 19 fixed to the side walls 12 and directed at the tips 2.

I claim:

1. A method of treating a candle having an elongated wax body formed around a wick and having a tip from which the wick projects and formed with a shoulder, the method comprising the steps of:

orienting the candle upside down with the tip from which the wick projects directed downward; and projecting heat against a surface of the tip and thereby melting wax on the surface of the tip such that the melted wax runs down and drips off the candle tip and wick projecting therefrom, thereby melting off the shoulder and forming a smooth tapered end on the candle.

2. The candle-treating method defined in claim 1 wherein heat is projected against the tip by directing a hot-air jet against the tip.

3. The candle-treating method defined in claim 1 whereby heat is projected against the tip by projecting infrared radiation against the tip.

4. The candle-treating method defined in claim 1, further comprising the step of rotating the candle about a central longitudinal candle axis while projecting heat against its tip.

* * * * *